US006958103B2

(12) United States Patent

Anderson et al.

(10) Patent No.: US 6,958,103 B2
(45) Date of Patent: *Oct. 25, 2005

(54) ENTANGLED FABRICS CONTAINING STAPLE FIBERS

(75) Inventors: Ralph L. Anderson, Marietta, GA (US); Eugenio G. Varona, Marietta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 122 days.

This patent is subject to a terminal disclaimer.

(21) Appl. No.: 10/328,751

(22) Filed: Dec. 23, 2002

(65) Prior Publication Data

US 2004/0121689 A1 Jun. 24, 2004

(51) Int. Cl.[7] ............................ B31F 1/12; D04H 1/06; D04H 11/08

(52) U.S. Cl. ....................... 156/183; 156/229; 162/111; 162/113; 264/282; 442/384; 28/103

(58) Field of Search ................................ 156/183, 229; 162/111–113; 264/280, 284, 282; 442/401, 408, 382, 384; 28/103, 104, 107, 112, 155

(56) References Cited

U.S. PATENT DOCUMENTS

| | | | |
|---|---|---|---|
| 1,301,605 | A | 4/1919 | Ringel |
| 2,014,460 | A | 9/1935 | Alm |
| 2,069,778 | A | 2/1937 | Rowe |
| 2,666,369 | A | 1/1954 | Niks |
| 3,338,992 | A | 8/1967 | Kinney |
| 3,341,394 | A | 9/1967 | Kinney |
| 3,485,706 | A | 12/1969 | Evans |
| 3,494,821 | A | 2/1970 | Evans |
| 3,502,538 | A | 3/1970 | Peterson |
| 3,502,763 | A | 3/1970 | Hartman |
| 3,542,615 | A | 11/1970 | Dobo et al. |
| 3,597,299 | A | 8/1971 | Thomas et al. |
| 3,692,618 | A | 9/1972 | Dorschner et al. |
| 3,775,231 | A | 11/1973 | Thomas |
| 3,802,817 | A | 4/1974 | Matsuki et al. |

(Continued)

FOREIGN PATENT DOCUMENTS

| | | |
|---|---|---|
| CA | 2165107 | 6/1996 |
| EP | 0097036 A2 | 12/1983 |
| EP | 0171806 A2 | 2/1986 |
| EP | 0624676 B1 | 11/1994 |
| EP | 0669994 B1 | 9/1995 |

(Continued)

OTHER PUBLICATIONS

Abstract of Japanese Patent No. 10072753, Mar. 17, 1998.
Abstract of Japanese Patent No. 11323715, Nov. 26, 1999.
Abstract of Japanese Patent No. 2182962, Jul. 17, 1990.
Abstract of Japanese Patent No. 4034058, Feb. 5, 1992.
Abstract of Japanese Patent No. 4057950, Feb. 25, 1992.

(Continued)

*Primary Examiner*—Sue A. Purvis
(74) *Attorney, Agent, or Firm*—Dority & Manning, P.A.

(57) ABSTRACT

An entangled fabric that contains a nonwoven web hydraulically entangled with a fibrous component is provided. The nonwoven web is formed from staple fibers and is creped. For example, in one embodiment, the nonwoven web is a creped, point bonded, carded web. Excellent liquid handling properties can be achieved in accordance with the present invention without resulting in the poor liquid handling capabilities often associated with point bonded nonwoven webs. In fact, the entangled fabric of the present invention can have improved bulk, softness, and capillary tension.

15 Claims, 2 Drawing Sheets

U.S. PATENT DOCUMENTS

| | | | | |
|---|---|---|---|---|
| 3,821,068 | A | | 6/1974 | Shaw |
| 3,844,869 | A | | 10/1974 | Rust, Jr. |
| 3,849,241 | A | | 11/1974 | Butin et al. |
| 3,855,046 | A | | 12/1974 | Hansen et al. |
| 3,879,257 | A | | 4/1975 | Gentile et al. |
| 3,914,365 | A | | 10/1975 | Kim et al. |
| 3,939,033 | A | | 2/1976 | Grgach et al. |
| 3,949,128 | A | | 4/1976 | Ostermeier |
| 3,953,638 | A | | 4/1976 | Kemp |
| 4,100,324 | A | | 7/1978 | Anderson et al. |
| 4,107,374 | A | | 8/1978 | Kusunose et al. |
| 4,144,370 | A | | 3/1979 | Boulton |
| 4,145,468 | A | | 3/1979 | Mizoguchi et al. |
| 4,165,556 | A | | 8/1979 | Nishida et al. |
| 4,239,720 | A | | 12/1980 | Gerlach et al. |
| 4,259,399 | A | | 3/1981 | Hill |
| 4,307,143 | A | | 12/1981 | Meitner |
| 4,340,563 | A | | 7/1982 | Appel et al. |
| 4,365,466 | A | | 12/1982 | Horiuchi et al. |
| 4,369,156 | A | | 1/1983 | Mathes et al. |
| 4,374,888 | A | | 2/1983 | Bornslaeger |
| 4,460,699 | A | | 7/1984 | Convers et al. |
| 4,476,186 | A | | 10/1984 | Kato et al. |
| RE31,885 | E | | 5/1985 | Meitner |
| 4,519,804 | A | | 5/1985 | Kato et al. |
| 4,587,154 | A | | 5/1986 | Hotchkiss et al. |
| 4,612,228 | A | | 9/1986 | Kato et al. |
| 4,735,849 | A | | 4/1988 | Murakami et al. |
| 4,774,110 | A | | 9/1988 | Murakami et al. |
| 4,795,122 | A | | 1/1989 | Petre |
| 4,795,668 | A | | 1/1989 | Krueger et al. |
| 4,808,467 | A | | 2/1989 | Suskind et al. |
| 4,833,012 | A | | 5/1989 | Makimura et al. |
| 4,879,170 | A | | 11/1989 | Radwanski et al. |
| 4,931,355 | A | | 6/1990 | Radwanski et al. |
| 4,965,122 | A | | 10/1990 | Morman |
| 4,981,747 | A | | 1/1991 | Morman |
| 5,026,587 | A | | 6/1991 | Austin et al. |
| 5,057,368 | A | | 10/1991 | Largman et al. |
| 5,069,970 | A | | 12/1991 | Largman et al. |
| 5,096,532 | A | | 3/1992 | Neuwirth et al. |
| 5,108,820 | A | | 4/1992 | Kaneko et al. |
| 5,110,403 | A | | 5/1992 | Ehlert |
| 5,136,761 | A | | 8/1992 | Sternlieb et al. |
| 5,137,600 | A | | 8/1992 | Barnes et al. |
| 5,162,074 | A | | 11/1992 | Hills |
| 5,204,703 | A | | 4/1993 | Hutchinson et al. |
| 5,219,633 | A | | 6/1993 | Sabee |
| 5,223,319 | A | | 6/1993 | Cotton et al. |
| 5,226,992 | A | | 7/1993 | Morman |
| 5,254,399 | A | | 10/1993 | Oku et al. |
| 5,258,220 | A | | 11/1993 | Joseph |
| 5,277,976 | A | | 1/1994 | Hogle et al. |
| 5,281,463 | A | | 1/1994 | Cotton |
| 5,284,703 | A | | 2/1994 | Everhart et al. |
| 5,290,628 | A | | 3/1994 | Lim et al. |
| 5,336,545 | A | | 8/1994 | Morman |
| 5,336,552 | A | | 8/1994 | Strack et al. |
| 5,350,624 | A | | 9/1994 | Georger et al. |
| 5,355,565 | A | | 10/1994 | Baravian |
| 5,364,680 | A | | 11/1994 | Cotton |
| 5,366,793 | A | | 11/1994 | Fitts, Jr. et al. |
| 5,382,400 | A | | 1/1995 | Pike et al. |
| 5,389,202 | A | | 2/1995 | Everhart et al. |
| 5,393,599 | A | | 2/1995 | Quantrille et al. |
| 5,413,811 | A | | 5/1995 | Fitting et al. |
| 5,466,410 | A | | 11/1995 | Hills |
| 5,498,232 | A | | 3/1996 | Scholz |
| 5,509,430 | A | | 4/1996 | Berger |
| D369,907 | S | | 5/1996 | Sayovitz et al. |
| 5,534,340 | A | | 7/1996 | Gupta et al. |
| 5,573,719 | A | | 11/1996 | Fitting |
| 5,573,841 | A | | 11/1996 | Adam et al. |
| 5,575,874 | A | | 11/1996 | Griesbach, III et al. |
| 5,587,225 | A | | 12/1996 | Griesbach et al. |
| 5,607,798 | A | | 3/1997 | Kobylivker et al. |
| 5,614,281 | A | | 3/1997 | Jackson et al. |
| 5,620,779 | A | | 4/1997 | Levy et al. |
| 5,635,290 | A | | 6/1997 | Stopper et al. |
| 5,643,240 | A | | 7/1997 | Jackson et al. |
| 5,647,883 | A | | 7/1997 | Houpt et al. |
| 5,652,051 | A | | 7/1997 | Shawver et al. |
| 5,704,101 | A | | 1/1998 | Majors et al. |
| 5,707,468 | A | | 1/1998 | Arnold et al. |
| D390,708 | S | | 2/1998 | Brown |
| 5,718,972 | A | | 2/1998 | Murase et al. |
| 5,719,219 | A | | 2/1998 | Shah et al. |
| 5,733,635 | A | | 3/1998 | Terakawa et al. |
| 5,759,926 | A | | 6/1998 | Pike et al. |
| 5,770,309 | A | | 6/1998 | Houpt et al. |
| 5,780,369 | A | | 7/1998 | Allison et al. |
| 5,783,503 | A | | 7/1998 | Gillespie et al. |
| 5,785,179 | A | | 7/1998 | Buczwinski et al. |
| 5,801,107 | A | | 9/1998 | Everhart et al. |
| 5,810,954 | A | | 9/1998 | Jacobs et al. |
| 5,814,390 | A | | 9/1998 | Stokes et al. |
| 5,817,199 | A | | 10/1998 | Brennecke et al. |
| 5,840,633 | A | | 11/1998 | Kurihara et al. |
| 5,853,635 | A | | 12/1998 | Morell et al. |
| 5,853,859 | A | | 12/1998 | Levy et al. |
| 5,858,504 | A | | 1/1999 | Fitting |
| 5,858,515 | A | | 1/1999 | Stokes et al. |
| 5,885,909 | A | | 3/1999 | Rudisill et al. |
| 5,895,710 | A | | 4/1999 | Sasse et al. |
| 5,914,084 | A | | 6/1999 | Benson et al. |
| 5,935,512 | A | | 8/1999 | Haynes et al. |
| 5,935,883 | A | | 8/1999 | Pike |
| 5,962,112 | A | | 10/1999 | Haynes et al. |
| 5,964,351 | A | | 10/1999 | Zander |
| 5,965,084 | A | | 10/1999 | Nishijima |
| 5,968,855 | A | | 10/1999 | Perdelwitz, Jr. et al. |
| 5,979,030 | A | | 11/1999 | Legare |
| 5,993,944 | A | | 11/1999 | Honna et al. |
| 6,004,673 | A | | 12/1999 | Nishijima |
| 6,022,818 | A | | 2/2000 | Welchel et al. |
| 6,030,331 | A | | 2/2000 | Zander |
| 6,063,717 | A | | 5/2000 | Ishiyama et al. |
| 6,069,097 | A | | 5/2000 | Suzuki et al. |
| 6,080,466 | A | | 6/2000 | Yoshimura et al. |
| D428,267 | S | | 7/2000 | Romano, III et al. |
| 6,093,665 | A | | 7/2000 | Sayovitz et al. |
| D428,710 | S | | 8/2000 | Romano, III et al. |
| 6,103,061 | A | | 8/2000 | Anderson et al. |
| 6,107,268 | A | | 8/2000 | Yahiaoui et al. |
| 6,110,848 | A | | 8/2000 | Bouchette |
| 6,114,263 | A | | 9/2000 | Benson et al. |
| 6,136,775 | A | | 10/2000 | Strout et al. |
| 6,150,002 | A | * | 11/2000 | Varona ........................ 428/99 |
| 6,158,614 | A | | 12/2000 | Haines et al. |
| 6,187,699 | B1 | | 2/2001 | Terakawa et al. |
| 6,197,404 | B1 | | 3/2001 | Varona |
| 6,200,669 | B1 | | 3/2001 | Marmon et al. |
| 6,258,196 | B1 | | 7/2001 | Suzuki et al. |
| 6,264,776 | B1 | | 7/2001 | DiPalma |
| 6,269,969 | B1 | | 8/2001 | Huang et al. |
| 6,269,970 | B1 | | 8/2001 | Huang et al. |
| 6,273,359 | B1 | | 8/2001 | Newman et al. |
| 6,314,627 | B1 | | 11/2001 | Ngai |
| 6,315,864 | B2 | | 11/2001 | Anderson et al. |
| 6,325,864 | B1 | | 12/2001 | Zahuranec et al. |
| 6,375,889 | B1 | | 4/2002 | Holmes et al. |

| | | | |
|---|---|---|---|
| 6,381,817 | B1 | 5/2002 | Moody, III |
| 6,460,233 | B2 | 10/2002 | Noelle |
| 6,461,729 | B1 | 10/2002 | Dugan |
| 6,723,669 | B1 | 4/2004 | Clark et al. |
| 6,797,226 | B2 | 9/2004 | Annable |
| 2001/0008180 | A1 | 7/2001 | Anderson et al. |
| 2001/0037850 | A1 | 11/2001 | Marmon et al. |
| 2002/0006502 | A1 | 1/2002 | Nagaoka et al. |
| 2002/0015069 | A1 | 2/2002 | Yamamoto et al. |
| 2002/0034907 | A1 | 3/2002 | Groitzsch et al. |
| 2002/0099347 | A1 | 7/2002 | Chen et al. |
| 2002/0110655 | A1 | 8/2002 | Seth |
| 2002/0132545 | A1 | 9/2002 | Lenz |
| 2003/0003832 | A1 | 1/2003 | Childs et al. |
| 2003/0131919 | A1 | 7/2003 | King et al. |
| 2003/0194932 | A1 | 10/2003 | Clark et al. |
| 2003/0207636 | A1 | 11/2003 | Gosavi et al. |

FOREIGN PATENT DOCUMENTS

| | | | |
|---|---|---|---|
| EP | 0685586 | A3 | 12/1995 |
| EP | 0685586 | A2 | 12/1995 |
| EP | 0719355 | B1 | 7/1996 |
| EP | 0765959 | B1 | 4/1997 |
| EP | 0796940 | A1 | 9/1997 |
| EP | 0872206 | A1 | 10/1998 |
| EP | 0949371 | A2 | 10/1999 |
| EP | 0963745 | A1 | 12/1999 |
| EP | 0992338 | A2 | 4/2000 |
| EP | 1050612 | A1 | 11/2000 |
| GB | 935124 | | 8/1963 |
| WO | WO 9612615 | A1 | 5/1996 |
| WO | WO 9719808 | A1 | 6/1997 |
| WO | WO 9809010 | A1 | 3/1998 |
| WO | WO 9920821 | A1 | 4/1999 |
| WO | WO 9920822 | A1 | 4/1999 |
| WO | WO 9922059 | A1 | 5/1999 |
| WO | WO 0008245 | A1 | 2/2000 |
| WO | WO 0141622 | A2 | 6/2001 |
| WO | WO 0188247 | A1 | 11/2001 |
| WO | WO 0234511 | A1 | 5/2002 |
| WO | WO 0238846 | A3 | 5/2002 |
| WO | WO 0238846 | A2 | 5/2002 |
| WO | WO 02064360 | A1 | 8/2002 |
| WO | WO 02064871 | A2 | 8/2002 |
| WO | WO 02076723 | A1 | 10/2002 |

OTHER PUBLICATIONS

Abstract of Japanese Patent No. 4257359, Sep. 11, 1992.
Abstract of Japanese Patent No. 4272219, Sep. 29, 1992.
Abstract of Japanese Patent No. 48033174, May 8, 1973.
Abstract of Japanese Patent No. 5179545, Jul. 20, 1993.
Abstract of Japanese Patent No. 5214653, Aug. 24, 1993.
Abstract of Japanese Patent No. 5287660, Nov. 2, 1993.
Abstract of Japanese Patent No. 5321018, Dec. 7, 1993.
Abstract of Japanese Patent No. 6184823, Jul. 5, 1994.
Abstract of Japanese Patent No. 6207361, Jul. 26, 1994.
Abstract of Japanese Patent No. 62268861, Nov. 21, 1987.
Abstract of Japanese Patent No. 6264345, Sep. 20, 1994.
Abstract of Japanese Patent No. 6306754, Nov. 1, 1994.
Abstract of Japanese Patent No. 6313215, Nov. 8, 1994.
Abstract of Japanese Patent No. 6330447, Nov. 29, 1994.
Abstract of Japanese Patent No. 8260247, Oct. 8, 1996.
Abstract of Japanese Patent No. 8311717, Nov. 26, 1996.
Abstract of Japanese Patent No. 8311718, Nov. 26, 1996.
PCT Search Report for PCT/US02/35120, Feb. 26, 2003.
PCT Search Report for PCT/US03/28824, Jan. 22, 2004.
PCT Search Report for PCT/US03/291715, Feb. 26, 2004.
Abstract of Japanese Patent No. JP5214654, Aug. 24, 1993.
Product Information for Kimberly–Clark Professional WYPALL® X Wipers, 2 pages, Mar. 6, 2003.
Article—"*Basic Chemistry of the Polyamides,*" Polyamide Resins (Reinhold Plastics Applications Series), Don E. Floyd, General Mills, Inc., pp. 31–64.
Search Report and Written Opinion for PCT/US2004/018873, Nov. 5, 2004.
Abstract of Japanese Patent No. 1026706, Jan. 30, 1989.
Search Report and Written Opinion for PCT/US2004/018875, Nov. 2, 2004.

* cited by examiner

ENTANGLED FABRICS CONTAINING STAPLE FIBERS

BACKGROUND OF THE INVENTION

Domestic and industrial wipers are often used to quickly absorb both polar liquids (e.g., water and alcohols) and nonpolar liquids (e.g., oil). The wipers must have a sufficient absorption capacity to hold the liquid within the wiper structure until it is desired to remove the liquid by pressure, e.g., wringing. In addition, the wipers must also possess good physical strength and abrasion resistance to withstand the tearing, stretching and abrading forces often applied during use. Moreover, the wipers should also be soft to the touch.

In the past, nonwoven fabrics, such as meltblown nonwoven webs, have been widely used as wipers. Meltblown nonwoven webs possess an interfiber capillary structure that is suitable for absorbing and retaining liquid. However, meltblown nonwoven webs sometimes lack the requisite physical properties for use as a heavy-duty wiper, e.g., tear strength and abrasion resistance. Consequently, meltblown nonwoven webs are typically laminated to a support layer, e.g., a spunbond nonwoven web, which may not be desirable for use on abrasive or rough surfaces.

Spunbond and staple fiber nonwoven webs, which contain thicker and stronger fibers than meltblown nonwoven webs and typically are point bonded with heat and pressure, can provide good physical properties, including tear strength and abrasion resistance. However, spunbond and staple fiber nonwoven webs sometimes lack fine interfiber capillary structures that enhance the adsorption characteristics of the wiper. Furthermore, spunbond and staple fiber nonwoven webs often contain bond points that may inhibit the flow or transfer of liquid within the nonwoven webs.

As such, a need remains for a fabric that is strong, soft, and also exhibits good absorption properties for use in a wide variety of wiper applications.

SUMMARY OF THE INVENTION

In accordance with one aspect of the present invention, a method is disclosed for forming a fabric. The method includes forming a bonded nonwoven web that defines a first surface and a second surface. The bonded nonwoven web comprises staple fibers. The staple fibers can be formed from a variety of materials and using any known staple fiber-forming process. For instance, in polyester, nylon, rayon, and combinations thereof. Moreover, in one embodiment, the staple fibers may also contain multicomponent fibers.

Once the nonwoven web is formed, a first surface of the web is adhered to a first creping surface from which the web is then creped. In one embodiment, for example, a creping adhesive is applied to the first surface of the nonwoven web in a spaced-apart pattern such that the first surface of the nonwoven web is adhered to the creping surface according to such spaced-apart pattern. Moreover, in some embodiments, the second surface of the nonwoven web can also be adhered to a second creping surface from which the web is then creped. Although not required, creping two surfaces of the web can sometimes enhance certain characteristics of the resulting fabric.

The creped nonwoven web is then hydraulically entangled with a fibrous component. If desired, the creped nonwoven web can be entangled with a fibrous material that comprises cellulosic fibers. Besides cellulosic fibers, the fibrous material may further comprise other types of fibers, such as synthetic staple fibers. In some embodiments, the fibrous component comprises greater than about 50% by weight of the fabric, and in some embodiments, from about 60% to about 90% by weight of the fabric.

In accordance with another aspect of the present invention, a composite fabric is disclosed that comprises a creped nonwoven web that is hydraulically entangled with a fibrous component that comprises cellulosic fibers. The creped nonwoven web comprises staple fibers. The fibrous component comprises greater than about 50% by weight of the fabric, and in some embodiments, from about 60% to about 90% by weight of the fabric. Further, in some embodiments, the staple fibers comprise multicomponent fibers and the nonwoven web is a point bonded, carded web.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
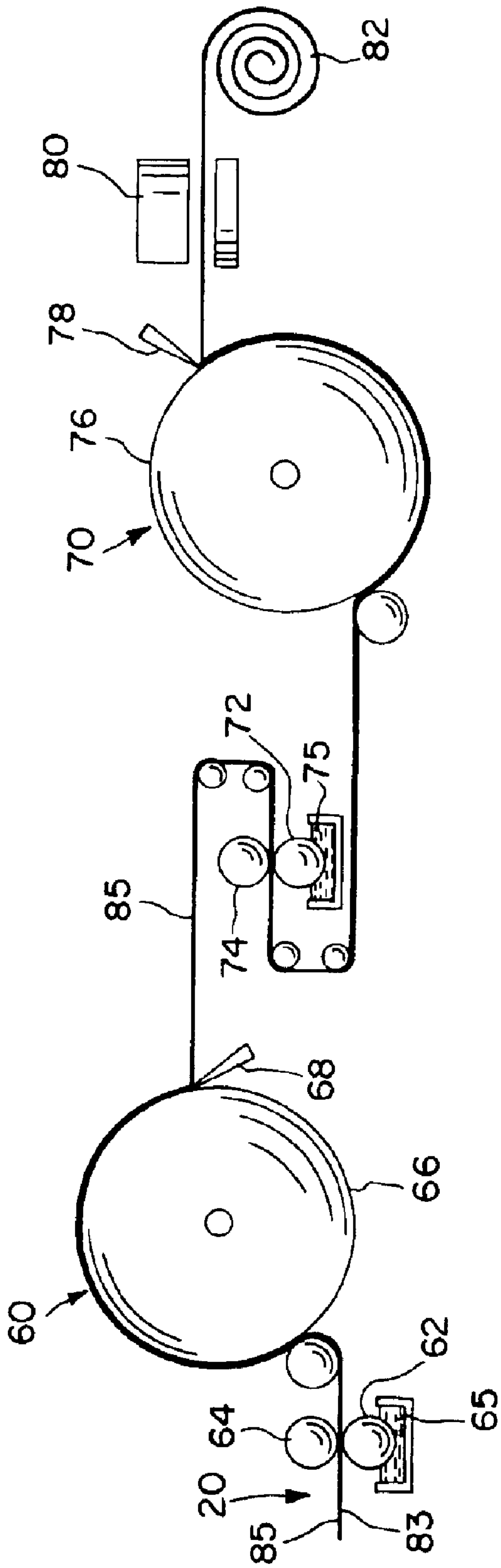
FIG. 1 is a schematic illustration of a process for creping a nonwoven substrate in accordance with one embodiment of the present invention.

Repeat use of reference characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention covers such modifications and variations as come within the scope of the appended claims and their equivalents.

Definitions

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, bonded carded web processes, etc.

As used herein, the term "carded web" refers to a web that is made from staple fibers sent through a combing or carding unit, which separates or breaks apart and aligns the fibers to form a nonwoven web.

As used herein, the term "multicomponent fibers" refers to fibers that have been formed from at least two polymer components. Such fibers are usually extruded from separate extruders but spun together to form one fiber. The polymers of the respective components are usually different from each other although multicomponent fibers may include separate components of similar or identical polymeric materials. The individual components are typically arranged in substantially constantly positioned distinct zones across the cross-section of the fiber and extend substantially along the entire length of the fiber. The configuration of such fibers may be, for example, a side-by-side arrangement, a pie arrangement, or any other arrangement. Bicomponent fibers and methods of making the same are taught in U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. The fibers and individual components containing the same may also have various irregular shapes such as those described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

As used herein, the term "pulp" refers to fibers from natural sources such as woody and non-woody plants. Woody plants include, for example, deciduous and coniferous trees. Non-woody plants include, for example, cotton, flax, esparto grass, milkweed, straw, jute, hemp, and bagasse.

As used herein, the term "average fiber length" refers to a weighted average length of pulp fibers determined utilizing a Kajaani fiber analyzer model No. FS-100 available from Kajaani Oy Electronics, Kajaani, Finland. According to the test procedure, a pulp sample is treated with a macerating liquid to ensure that no fiber bundles or shives are present. Each pulp sample is disintegrated into hot water and diluted to an approximately 0.001% solution. Individual test samples are drawn in approximately 50 to 100 ml portions from the dilute solution when tested using the standard Kajaani fiber analysis test procedure. The weighted average fiber length may be expressed by the following equation:

$$\sum_{x_i}^{k} (x_i * n_i)/n$$

wherein, k=maximum fiber length $x_i$=fiber length $n_i$=number of fibers having length $x_i$; and n=total number of fibers measured.

As used herein, the term "low-average fiber length pulp" refers to pulp that contains a significant amount of short fibers and non-fiber particles. Many secondary wood fiber pulps may be considered low average fiber length pulps; however, the quality of the secondary wood fiber pulp will depend on the quality of the recycled fibers and the type and amount of previous processing. Low-average fiber length pulps may have an average fiber length of less than about 1.2 mm as determined by an optical fiber analyzer such as, for example, a Kajaani fiber analyzer model No. FS-100 (Kajaani Oy Electronics, Kajaani, Finland). For example, low average fiber length pulps may have an average fiber length ranging from about 0.7 to 1.2 mm. Exemplary low average fiber length pulps include virgin hardwood pulp, and secondary fiber pulp from sources such as, for example, office waste, newsprint, and paperboard scrap.

As used herein, the term "high-average fiber length pulp" refers to pulp that contains a relatively small amount of short fibers and non-fiber particles. High-average fiber length pulp is typically formed from certain non-secondary (i.e., virgin) fibers. Secondary fiber pulp that has been screened may also have a high-average fiber length. High-average fiber length pulps typically have an average fiber length of greater than about 1.5 mm as determined by an optical fiber analyzer such as, for example, a Kajaani fiber analyzer model No. FS-100 (Kajaani Oy Electronics, Kajaani, Finland). For example, a high-average fiber length pulp may have an average fiber length from about 1.5 mm to about 6 mm. Exemplary high-average fiber length pulps that are wood fiber pulps include, for example, bleached and unbleached virgin softwood fiber pulps.

As used herein, the term "thermal point bonding" refers to a bonding process that results in the formation of small, discrete bond points. For example, thermal point bonding may involve passing a fabric or web of fibers to be bonded between a heated calender roll and an anvil roll. The calender roll is usually, though not always, patterned in some way so that the entire fabric is not bonded across its entire surface, and the anvil roll is usually flat.

As used herein, the terms "pattern unbonded" or "point unbonded" refer to a bonding process that results in the formation of a pattern having continuous bonded areas defining a plurality of discrete unbonded areas. One suitable process for forming the pattern-unbonded nonwoven material includes providing a nonwoven fabric or web, providing opposedly positioned first and second calender rolls, and defining a nip therebetween, with at least-one of the rolls being heated and having a bonding pattern on its outermost surface including a continuous pattern of land areas defining a plurality of discrete openings, apertures or holes, and passing the nonwoven fabric or web within the nip formed by the rolls. Each of the openings in the roll or rolls defined by the continuous land areas forms a discrete unbonded area in at least one surface of the nonwoven fabric or web in which the fibers or filaments of the web are substantially or completely unbonded. Stated alternatively, the continuous pattern of land areas in the roll or rolls forms a continuous pattern of bonded areas that define a plurality of discrete unbonded areas on at least one surface of the nonwoven fabric or web.

As used herein, "through air bonding" refers to a process of bonding a nonwoven web in which air which is sufficiently hot to melt one of the polymers of which the fibers of the web are made is forced through the web. The melting and resolidification of the polymer provides the bonding.

As used herein, "ultrasonic bonding" refers to a process performed, for example, by passing the fabric between a sonic horn and anvil roll as illustrated in U.S. Pat. No. 4,374,888 to Bornslaeger, which is incorporated herein in its entirety by reference thereto for all purposes.

DETAILED DESCRIPTION

In general, the present invention is directed to an entangled fabric that contains a nonwoven web hydraulically entangled with a fibrous component. The nonwoven web is formed from staple fibers and is creped. For example, in one embodiment, the nonwoven web is a creped, point bonded, carded web. Surprisingly, excellent liquid handling properties can be achieved in accordance with the present invention without resulting in the poor liquid handling capabilities often associated with point bonded nonwoven webs. In fact, the entangled fabric of the present invention can have improved bulk, softness, and capillary tension.

The nonwoven web used in the fabric of the present invention may be formed by a variety of different processes and from a variety of different materials. For example, staple fibers, including monocomponent and/or multicomponent staple fibers, are generally used to form the nonwoven web, either alone, or in conjunction with other fibers (e.g., continuous fibers). Staple fibers often have a fiber length in the range of from about 1 to about 150 millimeters, in some embodiments from about 5 to about 50 millimeters, in some embodiments from about 10 to about 40 millimeters, and in some embodiments, from about 10 to about 25 millimeters. Generally, staple fibers are carded using a conventional carding process, e.g., a woolen or cotton carding process. Other processes, however, such as air laid or wet laid processes, may also be used to form the staple fiber web.

A wide variety of polymeric materials are known to be suitable for use in fabricating staple fibers. Examples include, but are not limited to, polyolefins, polyesters, polyamides, as well as other melt-spinnable and/or fiber forming polymers. The polyamides that may be used in the practice of this invention may be any polyamide known to those skilled in the art including copolymers and mixtures thereof. Examples of polyamides and their methods of synthesis may be found in "Polymer Resins" by Don E. Floyd (Library of Congress Catalog number 66-20811, Reinhold Publishing, NY, 1966). Particularly commercially useful polyamides are nylon-6, nylon 66, nylon-11 and nylon-12. These polyamides are available from a number of sources, such as Emser Industries of Sumter, S.C. (Grilon® & Grilamid® nylons) and Atochem, Inc. Polymers Division, of Glen Rock, N.J. (Rilsan® nylons), among others. Many polyolefins are available for fiber production, for example, polyethylenes such as Dow Chemical's ASPUN® 6811A LLDPE (linear low density polyethylene), 2553 LLDPE and 25355 and 12350 high density polyethylene are such suitable polymers. Fiber forming polypropylenes include Exxon Chemical Company's Escorene® PD 3445 polypropylene and Himont Chemical Co.'s PF-304. Numerous other suitable fiber forming polyolefins, in addition to those listed above, are also commercially available. In addition, other fibers, such as synthetic cellulosic fibers (e.g., rayon or viscose rayon) may also be used to form the staple fibers.

The denier per filament of the fibers used to form the nonwoven web may also vary. For instance, in one particular embodiment, the denier per filament of staple fibers used to form the nonwoven web is less than about 6, in some embodiments less than about 3, and in some embodiments, from about 1 to about 3.

In one particular embodiment of the present invention, multicomponent (e.g., bicomponent) staple fibers are utilized. For example, suitable configurations for the multicomponent fibers include side-by-side configurations and sheath-core configurations, and suitable sheath-core configurations include eccentric sheath-core and concentric sheath-core configurations. In some embodiments, as is well known in the art, the polymers used to form the multicomponent fibers have sufficiently different melting points to form different crystallization and/or solidification properties. The multicomponent fibers may have from about 20% to about 80%, and in some embodiments, from about 40% to about 60% by weight of the low melting polymer. Further, the multicomponent fibers may have from about 80% to about 20%, and in some embodiments, from about 60% to about 40%, by weight of the high melting polymer.

The staple fibers used to form the nonwoven web may also be bonded to improve the durability, strength, hand, aesthetics and/or other properties of the web. For instance, the nonwoven web can be thermally, ultrasonically, adhesively, and/or mechanically bonded. As an example, the nonwoven web can be point bonded. An exemplary point bonding process is thermal point bonding, which generally involves passing one or more layers between heated rolls, such as an engraved patterned roll and a second bonding roll. The engraved roll is patterned in some way so that the web is not bonded over its entire surface, and the second roll can be smooth or patterned. As a result, various patterns for engraved rolls have been developed for functional as well as aesthetic reasons. Exemplary bond patterns include, but are not limited to, those described in U.S. Pat. No. 3,855,046 to Hansen, et al., U.S. Pat. No. 5,620,779 to Levy, et al., U.S. Pat. No. 5,962,112 to Haynes, et al., U.S. Pat. No. 6,093,665 to Sayovitz, et al., U.S. Design Pat. No. 428,267 to Romano, et al. and U.S. Design Pat. No. 390,708 to Brown, which are incorporated herein in their entirety by reference thereto for all purposes. For instance, in some embodiments, the nonwoven web may be optionally bonded to have a total bond area of less than about 30% (as determined by conventional optical microscopic methods) and/or a uniform bond density greater than about 100 bonds per square inch. For example, the nonwoven web may have a total bond area from about 2% to about 30% and/or a bond density from about 250 to about 500 pin bonds per square inch. Such a combination of total bond area and/or bond density may, in some embodiments, be achieved by bonding the nonwoven web with a pin bond pattern having more than about 100 pin bonds per square inch that provides a total bond surface area less than about 30% when fully contacting a smooth anvil roll. In some embodiments, the bond pattern may have a pin bond density from about 250 to about 350 pin bonds per square inch and/or a total bond surface area from about 10% to about 25% when contacting a smooth anvil roll.

Further, the nonwoven web can be bonded by continuous seams or patterns (e.g., pattern unbonded). As additional examples, the nonwoven web can be bonded along the periphery of the sheet or simply across the width or cross-direction (CD) of the web adjacent the edges. Other bond techniques, such as a combination of thermal bonding and latex impregnation, may also be used. Alternatively and/or additionally, a resin, latex or adhesive may be applied to the nonwoven web by, for example, spraying or printing, and dried to provide the desired bonding. Still other suitable bonding techniques may be described in U.S. Pat. No. 5,284,703 to Everhart, et al., U.S. Pat. No. 6,103,061 to Anderson, et al., and U.S. Pat. No. 6,197,404 to Varona, which are incorporated herein in its entirety by reference thereto for all purposes.

The nonwoven web is also typically creped. Creping can impart microfolds into the web to provide a variety of different characteristics thereto. For instance, creping can open the pore structure of the nonwoven web, thereby increasing its permeability. Moreover, creping can also enhance the stretchability of the web in the machine and/or cross-machine directions, as well as increase its softness and bulk. Various techniques for creping nonwoven webs are described in U.S. Pat. No. 6,197,404 to Varona. For instance, FIG. 1 illustrates one embodiment of a creping process that can be used to crepe one or both sides of a nonwoven web 20. The nonwoven web 20 may be passed through a first creping station 60, a second creping station 70, or both. If it is desired to crepe the nonwoven web 20 on only one side, it may be passed through either the first creping station 60 or the second creping station 70, with one creping station or the other being bypassed. If it is desired to crepe the nonwoven web 20 on both sides, it may be passed through both creping stations 60 and 70.

A first side 83 of the web 20 may be creped using the first creping station 60. The creping station 60 includes first a printing station having a lower patterned or smooth printing roller 62, an upper smooth anvil roller 64, and a printing bath 65, and also includes a dryer roller 66 and associated creping blade 68.

The rollers 62 and 64 nip the web 20 and guide it forward. As the rollers 62 and 64 turn, the patterned or smooth printing roller 62 dips into bath 65 containing an adhesive material, and applies the adhesive material to the first side 83 of the web 20 in a partial coverage at a plurality of spaced apart locations, or in a total coverage. The adhesive-coated web 20 is then passed around drying drum 66 whereupon the adhesive-coated surface 83 becomes adhered to the drum 66. The first side 83 of the web 20 is then creped (i.e., lifted off the drum and bent) using doctor blade 68.

A second side 85 of the web 20 may be creped using the second creping station 70, regardless of whether or not the first creping station 60 has been bypassed. The second creping station 70 includes a second printing station including a lower patterned or smooth printing roller 72, an upper smooth anvil roller 74, and a printing bath 75, and also includes a dryer drum 76 and associated creping blade 78. The rollers 72 and 74 nip the web 20 and guide it forward. As the rollers 72 and 74 turn, the printing roller 72 dips into bath 75 containing adhesive material, and applies the adhesive to the second side 85 of the web 20 in a partial or total coverage. The adhesive-coated web 20 is then passed around drying drum 76 whereupon the adhesive-coated surface 85 becomes adhered to the drum 76. The second side 85 of the web 20 is then creped using doctor blade 78. After creping, the nonwoven web 20 may be passed through a chilling station 80 and wound onto a storage roll 82 before being entangled.

The adhesive materials applied to the web 20 at the first and/or second printing stations may enhance the adherence of the substrate to the creping drum, as well as reinforce the fibers of the web 20. For instance, in some embodiments, the adhesive materials may bond the web to such an extent that the optional bonding techniques described above are not utilized.

A wide variety of adhesive materials may generally be utilized to reinforce the fibers of the web 20 at the locations of adhesive application, and to temporarily adhere the web 20 to the surface of the drums 66 and/or 76. Elastomeric adhesives (i.e., materials capable of at least 75% elongation without rupture) are especially suitable. Suitable materials include without limitation aqueous-based styrene butadiene adhesives, neoprene, polyvinyl chloride, vinyl copolymers, polyamides, ethylene vinyl terpolymers and combinations thereof. For instance, one adhesive material that can be utilized is an acrylic polymer emulsion sold by the B. F. Goodrich Company under the trade name HYCAR®. The adhesive may be applied using the printing technique described above or may, alternatively, be applied by meltblowing, melt spraying, dripping, splattering, or any other technique capable of forming a partial or total adhesive coverage on the nonwoven web 20.

The percent adhesive coverage of the web 20 can be selected to obtain varying levels of creping. For instance, the adhesive can cover between about 5% to 100% of the web surface, in some embodiments between about 10% to about 70% of the web surface, and in some embodiments, between about 25% to about 50% of the web surface. The adhesive can also penetrate the nonwoven web 20 in the locations where the adhesive is applied. In particular, the adhesive typically penetrates through about 10% to about 50% of the nonwoven web thickness, although there may be greater or less adhesive penetration at some locations.

Optionally, the nonwoven web 20 can also be stretched in the machine and/or cross-machine directions before creping. Stretching of the web 20 can be used to optimize and enhance physical properties in the fabric including, but not limited to, softness, bulk, stretchability and recovery, permeability, basis weight, density, and liquid holding capacity. For example, in one embodiment, the web 20 can be mechanically stretched in the machine direction to cause the web 20 to contract or neck in the cross-machine direction. The resulting necked web 20 thus becomes more stretchable in the cross-machine direction. Mechanical stretching of the web 20 can be accomplished using any of a variety of processes that are well known in the art. For instance, the web 20 may be pre-stretched between about 0 to about 100% of its initial length in the machine direction to obtain a necked web that can be stretched (e.g., by about 0 to about 100%) in the cross-machine direction. Typically, the web 20 is stretched by about 10% to about 100% of its initial length, and more commonly by about 25% to about 75% of its initial length in the machine direction.

Once stretched, the web 20 can then be relatively dimensionally stabilized, first by the adhesive applied to the web 20, and second by the heat that is imparted during creping. This stabilization can set the cross-directional stretch properties of the web 20. The machine direction stretch is further stabilized by the out-of-plane deformation of the bonded areas of the nonwoven web 20 that occurs during creping. Other stretching techniques can also be utilized in the present invention to apply stretching tension in the machine and/or cross-machine directions. For instance, an example of suitable stretching processes is a tenter frame process that utilizes a gripping device, e.g., clips, to hold the edges of the nonwoven web and apply the stretching force. Still other examples of stretching techniques that are believed to be suitable for use in the present invention are described in U.S. Pat. No. 5,573,719 to Fitting, which is incorporated herein in its entirety by reference thereto for all purposes.

In accordance with the present invention, the nonwoven web is then hydraulically entangled. The nonwoven web may be entangled either alone, or in conjunction with other materials. For example, in some embodiments, the nonwoven web is integrally entangled with a cellulosic fiber component using hydraulic entanglement. The cellulosic fiber component can generally comprise any desired amount of the resulting fabric. For example, in some embodiments, the cellulosic fiber component can comprise greater than about 50% by weight of the fabric, and in some embodiments, between about 60% to about 90% by weight of the fabric. Likewise, in some embodiments, the nonwoven web can comprise less than about 50% by weight of the fabric, and in some embodiments, from about 10% to about 40% by weight of the fabric.

When utilized, the cellulosic fiber component can contain cellulosic fibers (e.g., pulp, thermomechanical pulp, synthetic cellulosic fibers, modified cellulosic fibers, and the like), as well as other types of fibers (e.g., synthetic staple fibers). Some examples of suitable cellulosic fiber sources include virgin wood fibers, such as thermomechanical, bleached and unbleached softwood and hardwood pulps. Secondary or recycled fibers, such as obtained from office waste, newsprint, brown paper stock, paperboard scrap, etc., may also be used. Further, vegetable fibers, such as abaca, flax, milkweed, cotton, modified cotton, cotton linters, can also be used. In addition, synthetic cellulosic fibers such as, for example, rayon and viscose rayon may be used. Modified cellulosic fibers may also be used. For example, the fibrous material may be composed of derivatives of cellulose formed by substitution of appropriate radicals (e.g., carboxyl, alkyl, acetate, nitrate, etc.) for hydroxyl groups along the carbon chain.

When utilized, pulp fibers may have any high-average fiber length pulp, low-average fiber length pulp, or mixtures of the same. High-average fiber length pulp fibers typically have an average fiber length from about 1.5 mm to about 6 mm. Some examples of such fibers may include, but are not limited to, northern softwood, southern softwood, redwood, red cedar, hemlock, pine (e.g., southern pines), spruce (e.g., black spruce), combinations thereof, and the like. Exemplary high-average fiber length wood pulps include those available from the Kimberly-Clark Corporation under the trade designation "Longlac 19".

The low-average fiber length pulp may be, for example, certain virgin hardwood pulps and secondary (i.e. recycled) fiber pulp from sources such as, for example, newsprint, reclaimed paperboard, and office waste. Hardwood fibers, such as eucalyptus, maple, birch, aspen, and the like, can also be used. Low-average fiber length pulp fibers typically have an average fiber length of less than about 1.2 mm, for example, from 0.7 mm to 1.2 mm. Mixtures of high-average fiber length and low-average fiber length pulps may contain a significant proportion of low-average fiber length pulps. For example, mixtures may contain more than about 50 percent by weight low-average fiber length pulp and less than about 50 percent by weight high-average fiber length pulp. One exemplary mixture contains 75% by weight low-average fiber length pulp and about 25% by weight high-average fiber length pulp.

As stated above, non-cellulosic fibers may also be utilized in the cellulosic fiber component. Some examples of suitable non-cellulosic fibers that can be used include, but are not limited to, polyolefin fibers, polyester fibers, nylon fibers, polyvinyl acetate fibers, and mixtures thereof. In some embodiments, the non-cellulosic fibers can be staple fibers having, for example, an average fiber length of between about 0.25 inches to about 0.375 inches. When non-cellulosic fibers are utilized, the cellulosic fiber component generally contains between about 80% to about 90% by weight cellulosic fibers, such as softwood pulp fibers, and between about 10% to about 20% by weight non-cellulosic fibers, such as polyester or polyolefin staple fibers.

Small amounts of wet-strength resins and/or resin binders may be added to the cellulosic fiber component to improve strength and abrasion resistance. Cross-linking agents and/or hydrating agents may also be added to the pulp mixture. Debonding agents may be added to the pulp mixture to reduce the degree of hydrogen bonding if a very open or loose nonwoven pulp fiber web is desired. The addition of certain debonding agents in the amount of, for example, about 1% to about 4% percent by weight of the fabric also appears to reduce the measured static and dynamic coefficients of friction and improve the abrasion resistance of the composite fabric. The debonding agent is believed to act as a lubricant or friction reducer.

Figure 2:
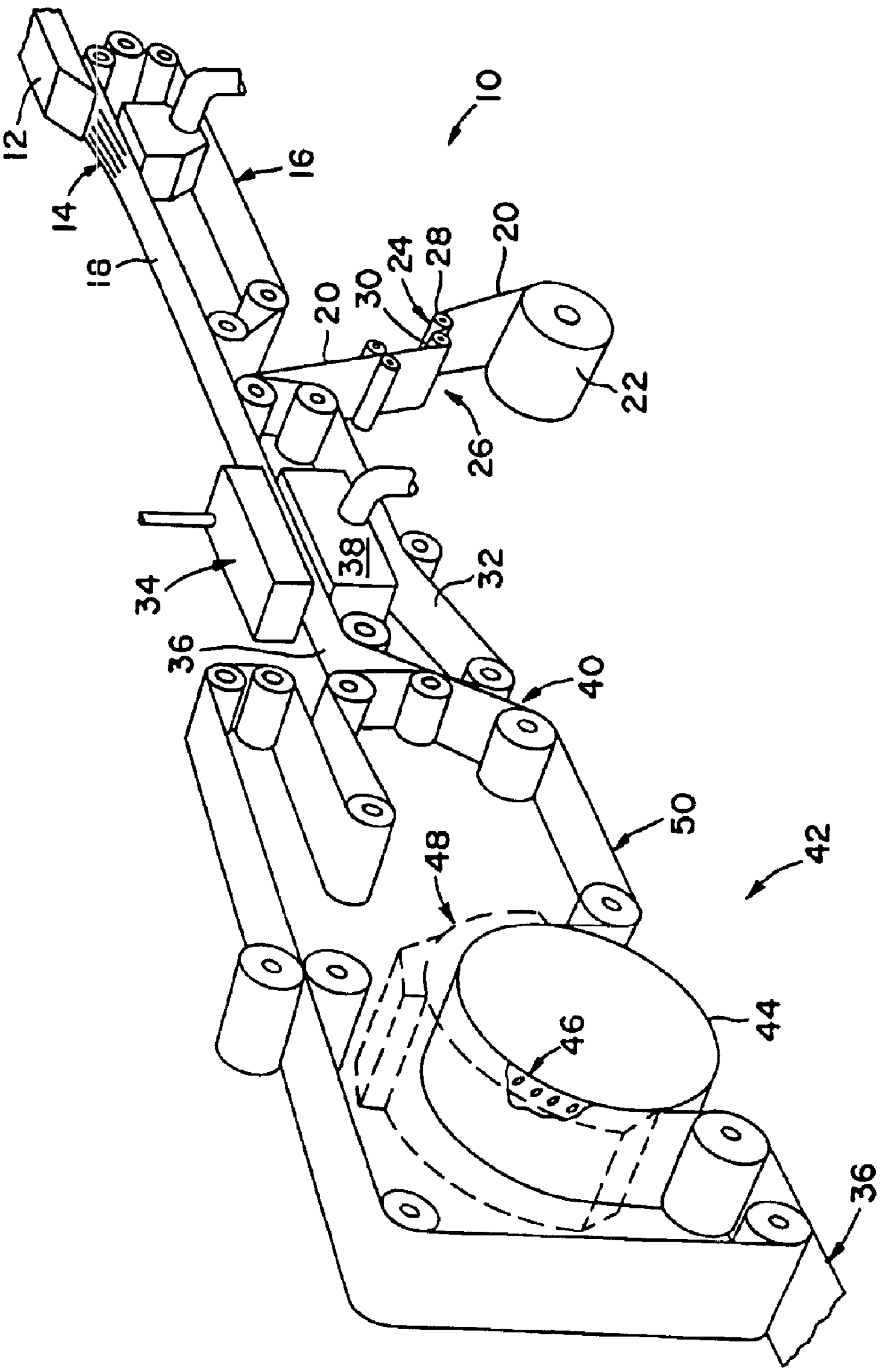
FIG. 2 is a schematic illustration of a process for forming a hydraulically entangled composite fabric in accordance with one embodiment of the present invention.

Referring to FIG. 2, one embodiment of the present invention for hydraulically entangling a cellulosic fiber component with a nonwoven web that contains staple fibers is illustrated. As shown, a fibrous slurry containing cellulosic fibers is conveyed to a conventional papermaking headbox 12 where it is deposited via a sluice 14 onto a conventional forming fabric or surface 16. The suspension of fibrous material may have any consistency that is typically used in conventional papermaking processes. For example, the suspension may contain from about 0.01 to about 1.5 percent by weight fibrous material suspended in water. Water is then removed from the suspension of fibrous material to form a uniform layer of the fibrous material 18.

The nonwoven web 20 is also unwound from a rotating supply roll 22 and passes through a nip 24 of a S-roll arrangement 26 formed by the stack rollers 28 and 30. The nonwoven web 20 passes through a nip 24 of a S-roll arrangement 26 formed by the stack rollers 28 and 30. The nonwoven web 20 is then placed upon a foraminous entangling surface 32 of a conventional hydraulic entangling machine where the cellulosic fibrous layer 18 is then laid on the web 20. Although not required, it is typically desired that the cellulosic fibrous layer 18 be between the nonwoven web 20 and the hydraulic entangling manifolds 34. The cellulosic fibrous layer 18 and nonwoven web 20 pass under one or more hydraulic entangling manifolds 34 and are treated with jets of fluid to entangle the cellulosic fibrous material with the fibers of the nonwoven web 20. The jets of fluid also drive cellulosic fibers into and through the nonwoven web 20 to form the composite fabric 36.

Alternatively, hydraulic entangling may take place while the cellulosic fibrous layer 18 and nonwoven web 20 are on the same foraminous screen (e.g., mesh fabric) that the wet-laying took place. The present invention also contemplates superposing a dried cellulosic fibrous sheet on a nonwoven web, rehydrating the dried sheet to a specified consistency and then subjecting the rehydrated sheet to hydraulic entangling. The hydraulic entangling may take place while the cellulosic fibrous layer 18 is highly saturated with water. For example, the cellulosic fibrous layer 18 may contain up to about 90% by weight water just before hydraulic entangling. Alternatively, the cellulosic fibrous layer 18 may be an air-laid or dry-laid layer.

Hydraulic entangling may be accomplished utilizing conventional hydraulic entangling equipment such as described in, for example, in U.S. Pat. No. 3,485,706 to Evans, which is incorporated herein in its entirety by reference thereto for all purposes. Hydraulic entangling may be carried out with any appropriate working fluid such as, for example, water. The working fluid flows through a manifold that evenly distributes the fluid to a series of individual holes or orifices. These holes or orifices may be from about 0.003 to about 0.015 inch in diameter and may be arranged in one or more rows with any number of orifices, e.g., 30–100 per inch, in each row. For example, a manifold produced by Honeycomb Systems Incorporated of Biddeford, Me., containing a strip having 0.007-inch diameter orifices, 30 holes per inch, and 1 row of holes may be utilized. However, it should also be understood that many other manifold configurations and combinations may be used. For example, a single manifold may be used or several manifolds may be arranged in succession.

Fluid can impact the cellulosic fibrous layer 18 and the nonwoven web 20, which are supported by a foraminous surface, such as a single plane mesh having a mesh size of from about 40×40 to about 100×100. The foraminous surface may also be a multi-ply mesh having a mesh size from about 50×50 to about 200×200. As is typical in many water jet treatment processes, vacuum slots 38 may be located directly beneath the hydro-needling manifolds or beneath the foraminous entangling surface 32 downstream of the entangling manifold so that excess water is withdrawn from the hydraulically entangled composite material 36.

Although not held to any particular theory of operation, it is believed that the columnar jets of working fluid that directly impact cellulosic fibers 18 laying on the nonwoven web 20 work to drive those fibers into and partially through the matrix or network of fibers in the web 20. When the fluid jets and cellulosic fibers 18 interact with a nonwoven web 20, the cellulosic fibers 18 are also entangled with fibers of the nonwoven web 20 and with each other. To achieve the desired entangling of the fibers, it is typically desired that hydroentangling be performed using water pressures from about 1000 to 3000 psig, and in some embodiments, from about 1200 to 1800 psig. When processed at the upper ranges of the described pressures, the composite fabric 36 may be processed at speeds of up to about 1000 feet per minute (fpm).

As indicated above the pressure of the jets in the entangling process is typically at least about 100 psig because lower pressures often do not generate the desired degree of entanglement. However, it should be understood that adequate entanglement may be achieved at substantially lower water pressures. In addition, greater entanglement may be achieved, in part, by subjecting the fibers to the entangling process two or more times. Thus, it may be desirable that the web be subjected to at least one run under the entangling apparatus, wherein the water jets are directed to the first side and an additional run wherein the water jets are directed to the opposite side of the web.

After the fluid jet treatment, the resulting composite fabric 36 may then be transferred to a non-compressive drying operation. A differential speed pickup roll 40 may be used to transfer the material from the hydraulic needling belt to a non-compressive drying operation. Alternatively, conventional vacuum-type pickups and transfer fabrics may be used. If desired, the composite fabric 36 may be wet-creped before being transferred to the drying operation. Non-compressive drying of the fabric 36 may be accomplished utilizing a conventional rotary drum through-air drying apparatus 42. The through-dryer 42 may be an outer rotatable cylinder 44 with perforations 46 in combination with an outer hood 48 for receiving hot air blown through the perforations 46. A through-dryer belt 50 carries the composite fabric 36 over the upper portion of the through-dryer outer cylinder 40. The heated air forced through the perforations 46 in the outer cylinder 44 of the through-dryer 42 removes water from the composite fabric 36. The temperature of the air forced through the composite fabric 36 by the through-dryer 42 may range from about 200° F. to about 500° F. Other useful through-drying methods and apparatus may be found in, for example, U.S. Pat. No. 2,666,369 to Niks and U.S. Pat. No. 3,821,068 to Shaw, which are incorporated herein in their entirety by reference thereto for all purposes.

It may also be desirable to use finishing steps and/or post treatment processes to impart selected properties to the composite fabric 36. For example, the fabric 36 may be lightly pressed by calender rolls, creped, brushed or otherwise treated to enhance stretch and/or to provide a uniform exterior appearance and/or certain tactile properties. For example, suitable creping techniques are described in U.S. Pat. No. 3,879,257 to Gentile, et al. and U.S. Pat. No. 6,315,864 to Anderson, et al., which are incorporated herein in their entirety by reference thereto for all purposes. Alternatively or additionally, various chemical post-treatments such as, adhesives or dyes may be added to the fabric 36. Additional post-treatments that can be utilized are described in U.S. Pat. No. 5,853,859 to Levy, et al., which is incorporated herein in its entirety by reference thereto for all purposes.

The basis weight of the fabric of the present invention can generally range from about 20 to about 200 grams per square meter (gsm), and particularly from about 50 gsm to about 150 gsm. Lower basis weight products are typically well suited for use as light duty wipers, while the higher basis weight products are better adapted for use as industrial wipers.

As a result of the present invention, it has been discovered that a fabric may be formed having a variety of beneficial characteristics. For example, by utilizing a nonwoven web component that is formed from relatively short, staple fibers, the resulting fabric may be softer and possess enhanced fluid reception properties. Further, when bonded and creped, such as described above, a soft nonwoven web can be formed that also has a bimodal pore size distribution. Generally speaking, a bimodal pore size distribution describes a structure that has at least two distinct classes of pores (without considering the micropores within the fibers themselves). For example, a bimodal pore size distribution may describe a first class of pores that include cells with boundaries defined by fibrous struts and a second class of pores that are smaller and defined between neighboring fibers. In other words, the distribution of fibers in the fibrous structure is not uniform throughout the space of the material, such that distinct cells having no or relatively few fibers can be defined in distinction to the pore spaces between neighboring or touching fibers. A bimodal pore size distribution can result in enhanced oil and water absorption properties. Specifically, the larger pores are generally better for handling oils, while the smaller pores are generally better for handling water. Further, the presence of larger pores also allows the resulting fabric to remain relatively stretchable in comparison to fabrics containing only small pores.

The present invention may be better understood with reference to the following example.

Test Methods

The following test methods are utilized in the Example.

Oil Absorption Efficiency

Viscous Oil Absorption is a method used to determine the ability of a fabric to wipe viscous oils. A sample of the web is first mounted on a padded surface of a sled (10 cm×6.3 cm). The sled is mounted on an arm designed to traverse the sled across a rotating disk. The sled is then weighted so that the combined weight of the sled and sample is about 768 grams. Thereafter, the sled and traverse arm are positioned on a horizontal rotatable disc with the sample being pressed against the surface of the disc by the weighted sled. Specifically, the sled and traverse arm are positioned with the leading edge of the sled (6.3 cm side) just off the center of the disc and with the 10 cm centerline of the sled being positioned along a radial line of the disc so that the trailing 6.3 cm edge is positioned near the perimeter of the disc.

One (1) gram of an oil is then placed on the center of the disc in front of the leading edge of the sled. The disc, which has a diameter of about 60 centimeters, is rotated at about 65 rpm while the traverse arm moves the sled across the disc at a speed of about 2½ centimeters per second until the trailing edge of the sled crosses off the outer edge of the disc. At this point, the test is stopped. The wiping efficiency is evaluated by measuring the change in weight of the wiper before and after the wiping test. The fractional wiping efficiency is determined as a percentage by dividing the increase in weight of the wiper by one (1) gram (the total oil weight), and multiplying by 100. The test described above is performed under constant temperature and relative humidity conditions (70° F.±2° F. and 65% relative humidity).

Web Permeability

Web permeability is obtained from a measurement of the resistance by the material to the flow of liquid. A liquid of known viscosity is forced through the material of a given thickness at a constant flow rate and the resistance to flow, measured as a pressure drop is monitored. Darcy's Law is used to determine permeability as follows:

Permeability=[flow rate×thickness×viscosity/pressure drop]

where the units are as follows:

| | |
|---|---|
| permeability: | $cm^2$ or darcy (1 darcy = 9.87 × 10 − 9 $cm^2$) |
| flow rate: | cm/sec |
| viscosity: | pascal-sec |
| pressure drop: | pascals |
| thickness: | cm |

The apparatus includes an arrangement wherein a piston within a cylinder pushes liquid through the sample to be measured. The sample is clamped between two aluminum cylinders with the cylinders oriented vertically. Both cylinders have an outside diameter of 3.5", an inside diameter of 2.5" and a length of about 6". The 3" diameter web sample is held in place by its outer edges and hence is completely contained within the apparatus. The bottom cylinder has a piston that is capable of moving vertically within the cylinder at a constant velocity and is connected to a pressure transducer that capable of monitoring the pressure encountered by a column of liquid supported by the piston. The transducer is positioned to travel with the piston such that there is no additional pressure measured until the liquid column contacts the sample and is pushed through it. At this point, the additional pressure measured is due to the resistance of the material to liquid flow through it. The piston is moved by a slide assembly that is driven by a stepper motor.

The test starts by moving the piston at a constant velocity until the liquid is pushed through the sample. The piston is then halted and the baseline pressure is noted. This corrects for sample buoyancy effects. The movement is then resumed for a time adequate to measure the new pressure. The difference between the two pressures is the pressure due to the resistance of the material to liquid flow and is the pressure drop used in the Equation set forth above. The velocity of the piston is the flow rate. Any liquid whose viscosity is known can be used, although a liquid that wets the material is preferred since this ensures that saturated flow is achieved. The measurements were carried out using a piston velocity of 20 cm/min, mineral oil (Peneteck Technical Mineral Oil manufactured by Penreco of Los Angeles, Calif.) of a viscosity of 6 centipoise. This method is also described in U.S. Pat. No. 6,197,404 to Varona, et al.

Drape Stiffness

The "drape stiffness" test measures the resistance to bending of a material. The bending length is a measure of the interaction between the material weight and stiffness as shown by the way in which the material bends under its own weight, in other words, by employing the principle of cantilever bending of the composite under its own weight. In general, the sample was slid at 4.75 inches per minute (12 cm/min), in a direction parallel to its long dimension, so that its leading edge projected from the edge of a horizontal surface. The length of the overhang was measured when the tip of the sample was depressed under its own weight to the point where the line joining the tip to the edge of the platform made a 41.50° angle with the horizontal. The longer the overhang, the slower the sample was to bend; thus, higher numbers indicate stiffer composites. This method conforms to specifications of ASTM Standard Test D 1388. The drape stiffness, measured in inches, is one-half of the length of the overhang of the specimen when it reaches the 41.50° slope.

The test samples were prepared as follows. Samples were cut into rectangular strips measuring 1 inch (2.54 cm) wide and 6 inches (15.24 cm) long. Specimens of each sample were tested in the machine direction and cross direction. A suitable Drape-Flex Stiffness Tester, such as FRL-Cantilever Bending Tester, Model 79-10 available from Testing Machines Inc., located in Amityville, N.Y., was used to perform the test.

Oil Absorbency Rate

The absorbency rate of oil is the time required, in seconds, for a sample to absorb a specified amount of oil. For example, the absorbency of 80W-90 gear oil was determined in the example as follows. A plate with a three-inch diameter opening was positioned on the top of a beaker. The sample was draped over the top of the beaker and covered with the plate to hold the specimen in place. A calibrated dropper was filled with oil and held above the sample. Four drops of oil were then dispensed from the dropper onto the sample, and a timer was started. After the oil was absorbed onto the sample and was no longer visible in the three-inch diameter opening, the timer was stopped and the time recorded. A lower absorption time, as measured in seconds, was an indication of a faster intake rate. The test was run at conditions of 73.4°±3.6° F. and 50%±5% relative humidity.

EXAMPLE

The ability to form an entangled fabric in accordance with the present invention was demonstrated. Two samples (Samples 1–2) were formed from different nonwoven webs.

Sample 1 was formed from a 1.2 osy (ounces per square yard) point bonded, carded web. The carded web contained a blend of 30% of rayon staple fibers and 70% of polyester/polyethylene bicomponent staple fibers (available from Chisso Corporation of Osaka, Japan). The rayon fibers had a denier of 3 and the bicomponent fibers had a denier of 3. The web was thermally point bonded using a wire weave bonding pattern at 295° F. The pointed bonded, carded web was creped using a degree of creping of 40%. The web was creped using National Starch and Chemical latex adhesive DUR-O-SET E-200. The adhesive was applied to web using gravure printing prior to being adhered to the creping drum. The creping drum was maintained at 190° F.

Sample 2 was formed from a 0.6 osy point bonded, spunbond web. The spunbond web contained 100% polypropylene fibers. The polypropylene fibers had a denier per filament of 3.0.

For Samples 1–2, the spunbond web was then hydraulically entangled on a coarse wire using three jet strips with a pulp fiber component at an entangling pressure of 1200 pounds per square inch. The pulp fiber component contained LL-19 northern softwood kraft fibers (available from Kimberly-Clark) and 1 wt. % of Arosurf® PA801 (a debonder available from Goldschmidt). The fabric was dried and print bonded to a dryer using an ethylene/vinyl acetate copolymer latex adhesive available from Air Products, Inc. under the name "Airflex A-105" (viscosity of 95 cps and 28% solids). The fabric was then creped using a degree of creping of 20%. The resulting fabric had a basis weight of about 110 grams per square meter, and contained 40% by weight of the nonwoven web and 60% of the pulp fiber component.

Various properties of Samples 1–2 were then tested. The results are set forth below in Table 1.

TABLE 1

Properties of Samples 1–2

| Sample | Oil Absorption Efficiency (%) | Web Permeability (darcies) | MD Drape Stiffness (inches) | CD Drape Stiffness (inches) | Oil Absorbency Rate (sec) |
|---|---|---|---|---|---|
| 1 | 82 | 209 | 3.00 | 2.85 | 7 |
| 2 | 62 | 70 | 3.55 | 2.85 | 26 |

Thus, as indicated above, Sample 1, which utilized a point bonded, carded web, had a better oil adsorption efficiency, web permeability, and oil absorbency rate than Sample 2, which utilized a spunbond web. In addition, such enhanced oil absorption characteristics were also obtained without substantially increasing the stiffness of the wiper, as evidenced by the relatively low drape stiffness value of Sample 1.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for forming a fabric comprising:

forming a bonded nonwoven web that defines a first surface and a second surface, said bonded nonwoven web comprising staple fibers, adhering said first surface of said bonded nonwoven web to a first creping surface;

creping said web from said first creping surface; and thereafter, hydraulically entangling said creped nonwoven web with a fibrous component.

2. A method as defined in claim 1, wherein the length of said staple fibers is from about 1 to about 150 millimeters.

3. A method as defined in claim 1, wherein the length of said staple fibers is from about 10 to about 40 millimeters.

4. A method as defined in claim 1, wherein said staple fibers comprise multicomponent fibers.

5. A method as defined in claim 1, wherein said staple fibers comprise polyethylene, polypropylene, polyester, nylon, rayon, or combinations thereof.

6. A method as defined in claim 1, wherein said nonwoven web is a carded web.

7. A method as defined in claim 1, wherein said nonwoven web is point bonded.

8. A method as defined in claim 1, wherein said fibrous component comprises cellulosic fibers.

9. A method as defined in claim 8, wherein said fibrous component comprises greater than about 50% by weight of the fabric.

10. A method as defined in claim 8, wherein said fibrous component comprises from about 60% to about 90% by weight of the fabric.

11. A method as defined in claim 1, further comprising applying a creping adhesive to said first surface of said nonwoven web in a spaced-apart pattern such that said first surface is adhered to said creping surface according to said spaced-apart pattern.

12. method as defined in claim 1, further comprising adhering said second surface of said nonwoven web to a second creping surface and creping said web from said second surface.

13. A method as defined in claim 12, further comprising applying a creping adhesive to said second surface of said nonwoven web in a spaced-apart pattern such that said second surface is adhered to said creping surface according to said spaced-apart pattern.

14. A method as defined in claim 1, wherein said nonwoven web is entangled with said fibrous component at a water pressure of from about 1000 pounds per square inch to about 3000 pounds per square inch.

15. A method as defined in claim 1, wherein said nonwoven web is entangled with said fibrous component at a water pressure of from about 1200 pounds per square inch to about 1800 pounds per square inch.

* * * * *

UNITED STATES PATENT AND TRADEMARK OFFICE

CERTIFICATE OF CORRECTION

PATENT NO. : 6,958,103 B2 Page 1 of 1
APPLICATION NO. : 10/328751
DATED : October 25, 2005
INVENTOR(S) : Ralph L. Anderson and Eugenio G. Varona It is certified that error appears in the above-identified patent and that said Letters Patent is hereby corrected as shown below:

Column 16, line 25, "method" should be --A method--

Signed and Sealed this

Twenty-seventh Day of March, 2007

JON W. DUDAS
*Director of the United States Patent and Trademark Office*